(12) United States Patent
Wong et al.

(10) Patent No.: US 6,283,282 B1
(45) Date of Patent: Sep. 4, 2001

(54) LOW-PROFILE COMPACT DISK CASE

(75) Inventors: Ming-Sen Wong, Taipei; Chen-Cheng Chang, Tao Yuan Shien, both of (TW)

(73) Assignee: CMC Magnetics Corporation, Taipei (TW)

( * ) Notice: Subject to any disclaimer, the term of this patent is extended or adjusted under 35 U.S.C. 154(b) by 0 days.

(21) Appl. No.: 09/531,154

(22) Filed: Mar. 17, 2000

(30) Foreign Application Priority Data

Oct. 25, 1999 (TW) ............................................ 88211758 U (51) Int. Cl.[7] .................................................. B65D 85/57
(52) U.S. Cl. ........................................ 206/308.1; 206/310
(58) Field of Search .................................. 206/303, 307, 206/308.1, 308.2, 310, 493

(56) References Cited

U.S. PATENT DOCUMENTS

| | | | |
|---|---|---|---|
| 3,949,872 | * 4/1976 | Paudras | 206/310 |
| 4,903,829 | * 2/1990 | Clemens | 206/310 |
| 5,238,107 | * 8/1993 | Kownacki | 206/310 |
| 5,341,924 | * 8/1994 | Morrone | 206/310 |
| 5,477,960 | * 12/1995 | Chen | 206/308.1 |
| 6,016,909 | * 1/2000 | Chang | 206/310 |

* cited by examiner

Primary Examiner—Jim Foster
(74) Attorney, Agent, or Firm—Dougherty & Troxell (57) ABSTRACT

A low-profile compact disk (CD) case includes pivotally connected top cover and bottom seat to provide an inner space for receiving a compact disk therein. The bottom seat is integrally formed on an inner surface with a central holding means and a plurality of protective means. The central holding means is a short hollow cylinder upward projected from the bottom seat and has spaced cuts along its circumferential wall to provide a plurality of flexible catch pawls for holding a compact disk in place. First and second protective means are low-raised ribs for supporting and preventing the compact disk from direct contact with the bottom seat, and the third protective means are raised curved ribs higher than the first and the second ribs and the compact disk for protecting the compact disk from compression by the top cover. No extra CD deck is required and an overall height or thickness and production costs of the CD case can therefore be largely reduced.

4 Claims, 4 Drawing Sheets

LOW-PROFILE COMPACT DISK CASE

BACKGROUND OF THE INVENTION

The present invention relates to a compact disk (CD) case, and more particularly to a low-profile CD case that has reduced overall height and can be produced with less material, assembling and transport costs while maintaining good packing quality thereof.

With the production of digital compact disks that provide large storage volume and precise signals, a variety of storage structures are developed for safely holding and storing such compact disks. An earliest and most common type of CD case mainly includes a bottom seat having a top cover pivotally and openably connected thereto, and a CD deck disposed in a space provided on the bottom seat. The CD deck includes a shallow recess for receiving a compact disk therein. A catch button having a plurality of radially extended flexible catch pawls is centered at the CD deck. A compact disk is positioned in the CD deck and accordingly the CD case by aligning a central hole of the compact disk with the catch button and pressing the disk downward, and removed from the CD deck by depressing a center of the catch button to cause retreated catch pawls and release the compact disk.

The above-described conventional CD case is a three-piece unit, a production of which would require longer time and higher costs for molds, material and assembling thereof.

Moreover, to contain the CD deck, the conventional CD case formed from the top cover and the bottom seat must have an overall height at least about 10mm that is several times of the thickness of a regular compact disk. Such a height of the three-piece CD case largely increases space and cost required for storing, packing and transporting the CD cases and the compact disks stored therein. The three-piece CD case also requires more plastic material to produce it and will therefore cause more environmental problems in disposal of the discarded plastic case.

There are thin paper bags or clear poly bags with one open end being used to contain individual compact disks. Such bags have the advantage of low production and transportation costs due to their small thickness. On the other hand, these bags give consumers the impression that they are used to hold compact disks of inferior quality.

SUMMARY OF THE INVENTION

A primary object of the present invention is to provide a low-profile CD case that has simplified structure to effectively reduce an overall height or thickness of the case without sacrificing the high quality appearance thereof.

To achieve the above and other objects, the present invention provide a CD case including pivotally connected top cover and bottom seat to provide an inner space for receiving a compact disk therein. The bottom seat is integrally formed on an inner surface with a central holding means and a plurality of protective means. The central holding means is a short hollow cylinder upward projected from the bottom seat and has spaced cuts along its circumferential wall to provide a plurality of flexible catch pawls for holding a compact disk in place. First and second protective means are low-raised ribs for supporting and preventing the compact disk from direct contact with the bottom seat, and the third protective means are raised curved ribs higher than the first and the second ribs and the compact disk for protecting the compact disk from compression by the top cover. No extra CD deck is required for disposing between the top cover and the bottom seat for holding the compact disk and an overall height or thickness of the CD case can therefore be largely reduced from about 10 mm to about 5.2 mm only. The CD case with reduced overall height occupies less room and requires lower production and transportation costs.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Please refer to FIGS. 1 through 4 at the same time in which a low-profile compact disk (CD) case according to the present invention is shown. The low-profile CD case mainly includes a top cover 1 and a bottom seat 2 that are pivotally connected to each other at one edge thereof to define a small and safe space between them large enough for holding a compact disk 5 therein.

Figure 2A:
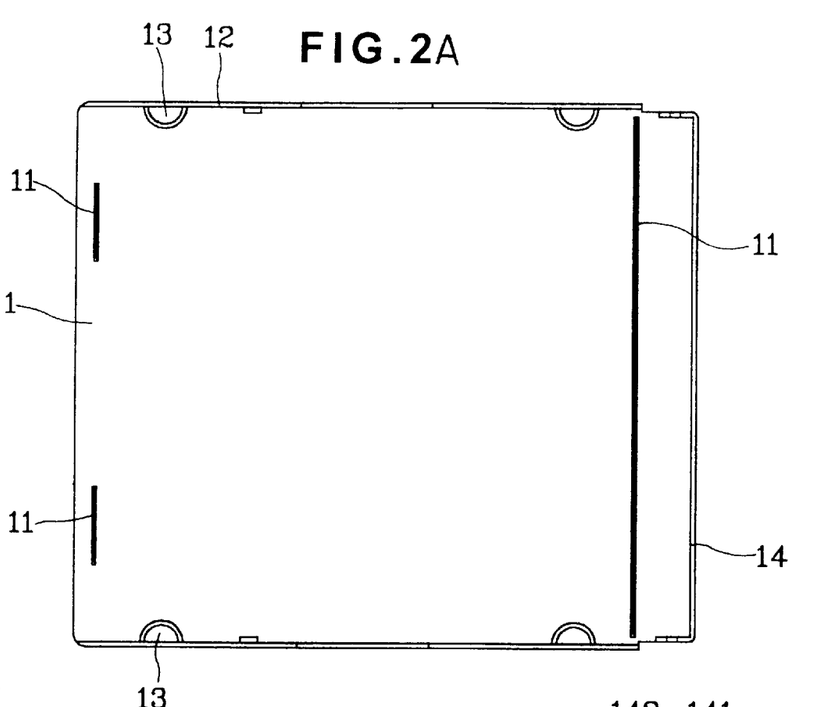
FIGS. 2A–2C show the top cover of the low-profile compact disk case of FIG. 1.
Figures 2A, 2B:
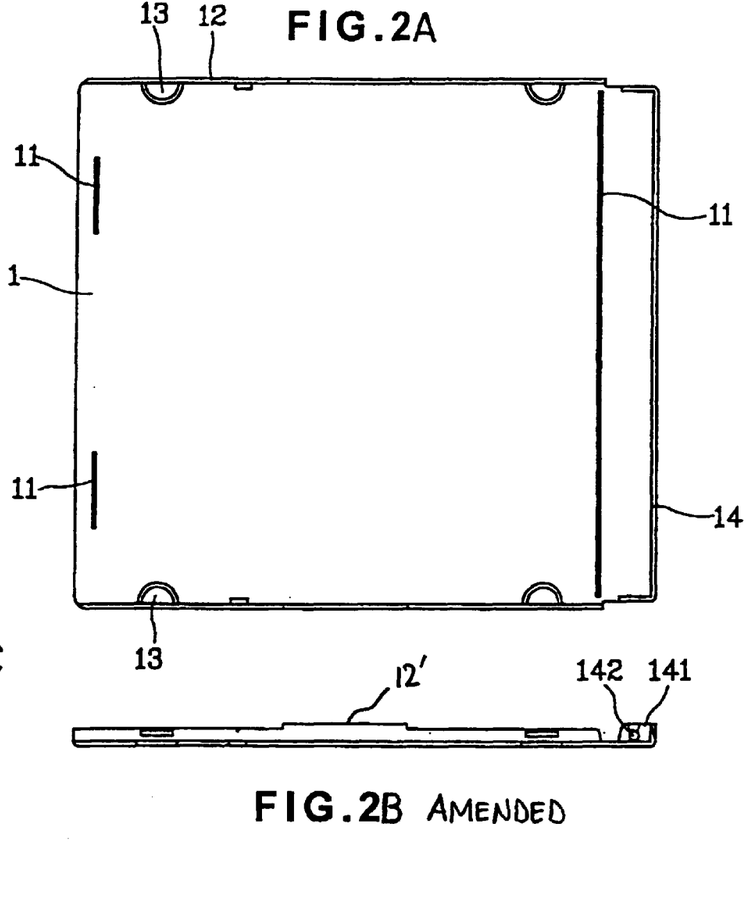
Figure 2B:
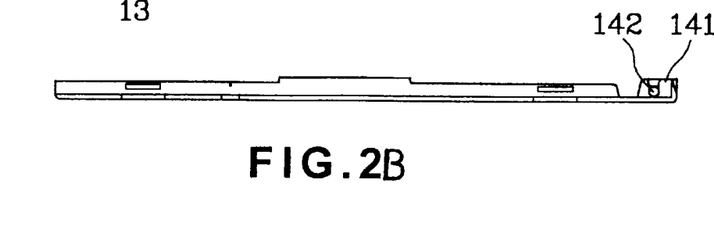
Figure 2C:
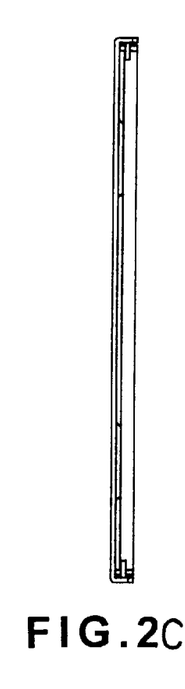

The top cover 1 includes a plane surface 1 defining a front (or free) end, a rear (or pivotal) end, and two lateral sides. Ribs 11 are provided on an inner side of the plane surface 1 near the front and the rear ends at predetermined positions for locating an advertising sheet (not shown) to the inner side of the plane surface 1. Two side walls 12 are separately formed along the two lateral sides of the plane surface 1 to vertically extend downward relative to the plane surface 1 by a predetermined small distance. Semicircular members 13 are preferably symmetrically provided on the two side walls 12 at suitable positions close to the front and the rear ends of the top cover 1, such that semicircular members 13 at two opposite sides of the top cover 1 project inward toward one another. A portion of the plane surface 1 near the rear end thereof has a slightly narrowed width. A rear wall 14 extends along the narrowed rear portion of the plane surface 1 to give a substantially n-shaped cross section including two short wings 141. The rear wall 14 also vertically extends downward relative to the plane surface 1 by a predetermined small distance. And, there is a pivotal hole 142 provided on the short wings 141 each.

Figure 3A:
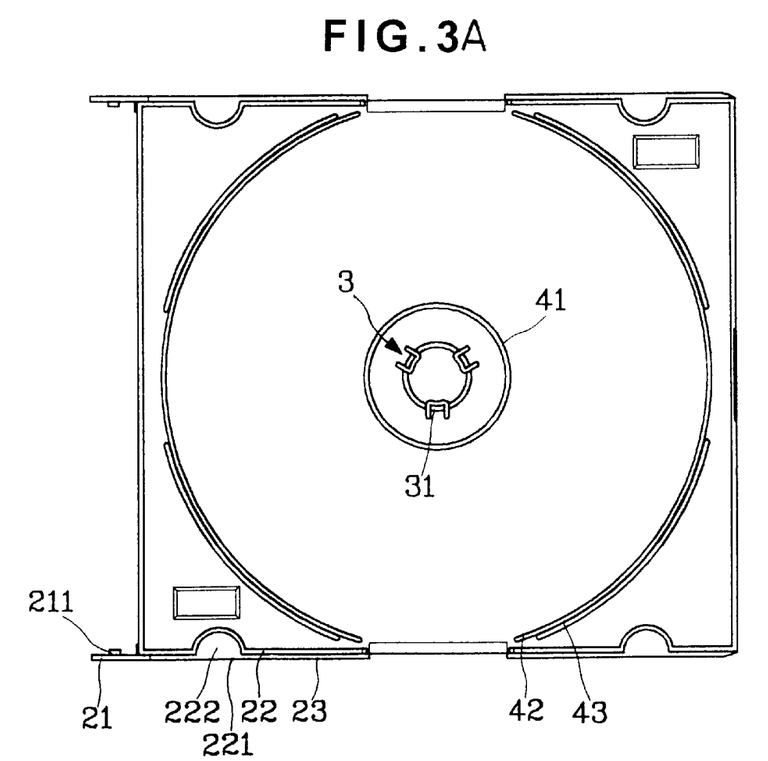
FIGS. 3A–3C show the bottom seat of the low-profile compact disk case of FIG. 1.
Figures 3A, 3B:
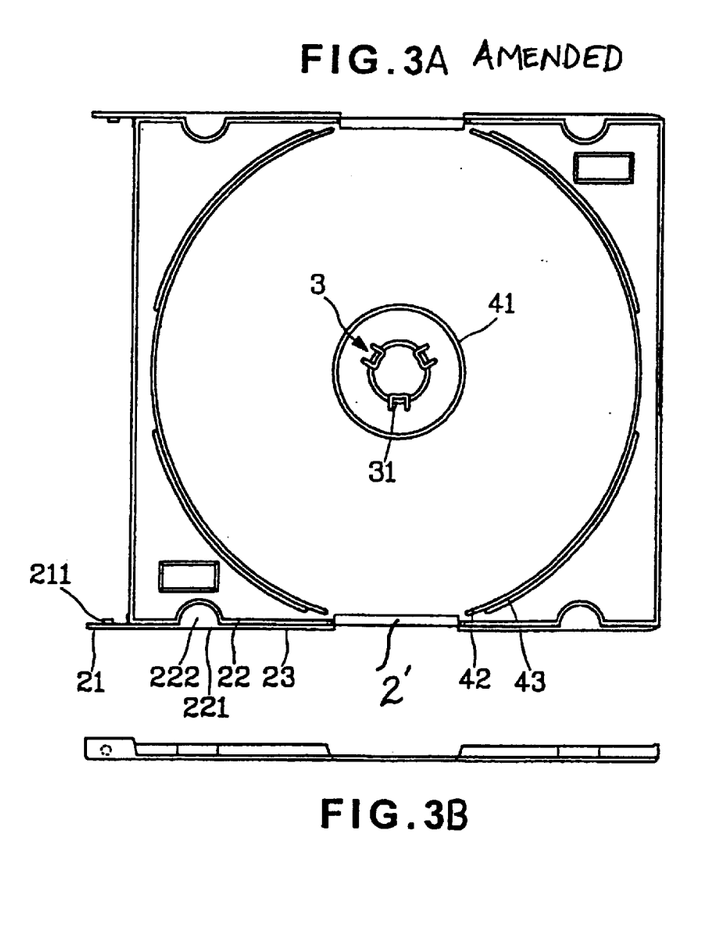
Figure 3B:
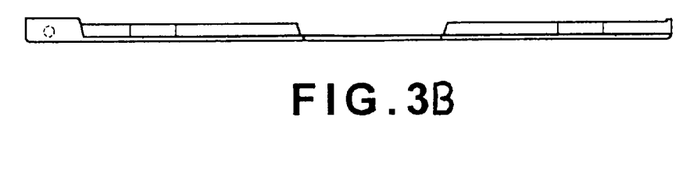
Figure 3C:
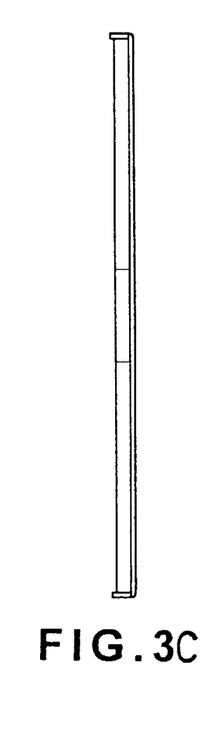

The bottom seat 2 includes a plane surface 2 defining a front (or free) end, a rear (or pivotal) end, and two lateral sides. The bottom seat 2 is provided at rear ends of the two lateral sides with an extended arm 21 each. Each of the extended arms 21 is provided at an inner side thereof with a protrusion 211 corresponding to the pivotal holes 142 on the two wings 141 of the top cover 1, such that the top cover may be pivotally connected at the rear or pivotal end to the bottom seat 2 by separately extending the two protrusions 211 into the two pivotal holes 142. Two walls 22 are provided on an inner side of the plane surface 2 to separately horizontally extend along the front and the rear ends of the bottom seat 2, such that the walls 22 have a substantially n-shaped cross section including two short wing portions 221. The walls 22 and the side walls 12 are so arranged that they together allow the top cover 1 to be pivotally and fitly closed onto the bottom seat 2.

Semicircular dust-proof recesses 222 are symmetrically provided on the two lateral sides of the bottom seat 2 within the wing portions 221 of the two n-shaped walls 22 and corresponding to the semicircular members 13 on the top cover 1. Narrow spaces are left between outer surfaces of the wing portions 221 of the walls 22 and outmost edges of the two lateral sides of the plane surface 2 to provide stepped shoulder portions 23, onto which the side walls 12 of the top cover 1 are rested when the top cover 1 is in its closed position over the bottom seat 2.

A central holding means 3 and a plurality of protective means are integrally formed on the inner side of the plane surface 2 when the bottom seat 2 is produced by, for example, injection molding.

The central holding means 3 is substantially a very short hollow cylinder with cuts spaced along its circumferential wall to provide a plurality of flexible catch pawls 31.

A first protective means is a low-raised circular rib 41 provided on the inner side of the plane surface 2 at properly decided position to encircle the central holding means 3 and be concentric with a central opening of a regular compact disk 5 that is positioned in the CD case. A second protective means includes two, for example, low-raised curved ribs 42 that also define a circle concentric with the central holding means 3 and extend along positions above which an outer periphery of a compact disk 5 will locate. A third protective means includes four, for example, spaced curved ribs 43 that are closely located along outer periphery of the second protective ribs 42 and have a height larger than that of the first and the second protective ribs 41, 42 and than a thickness of a regular compact disk 5.

Figure 1:
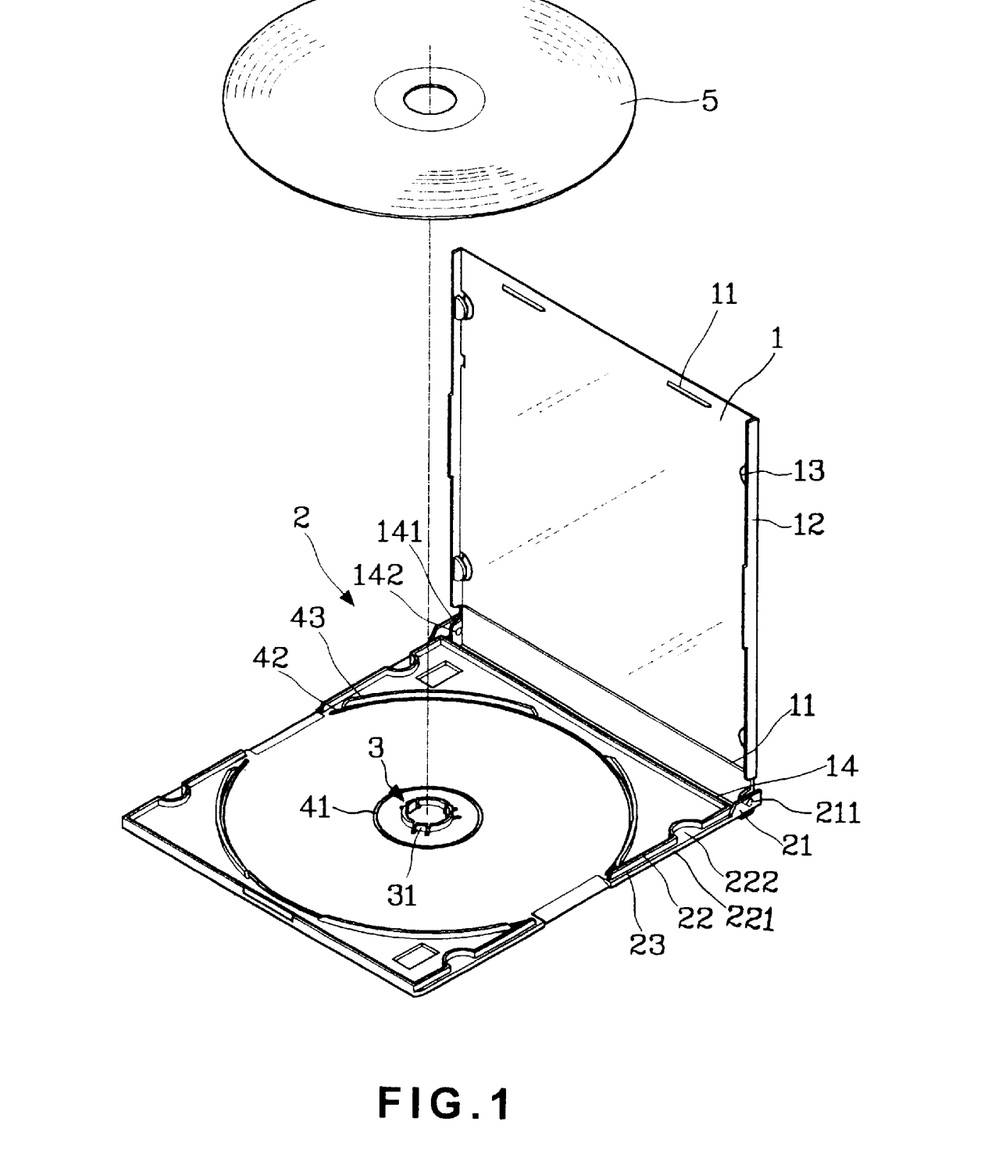
FIG. 1 is an assembled perspective of a low-profile compact disk case according to the present invention.
Figure 4:
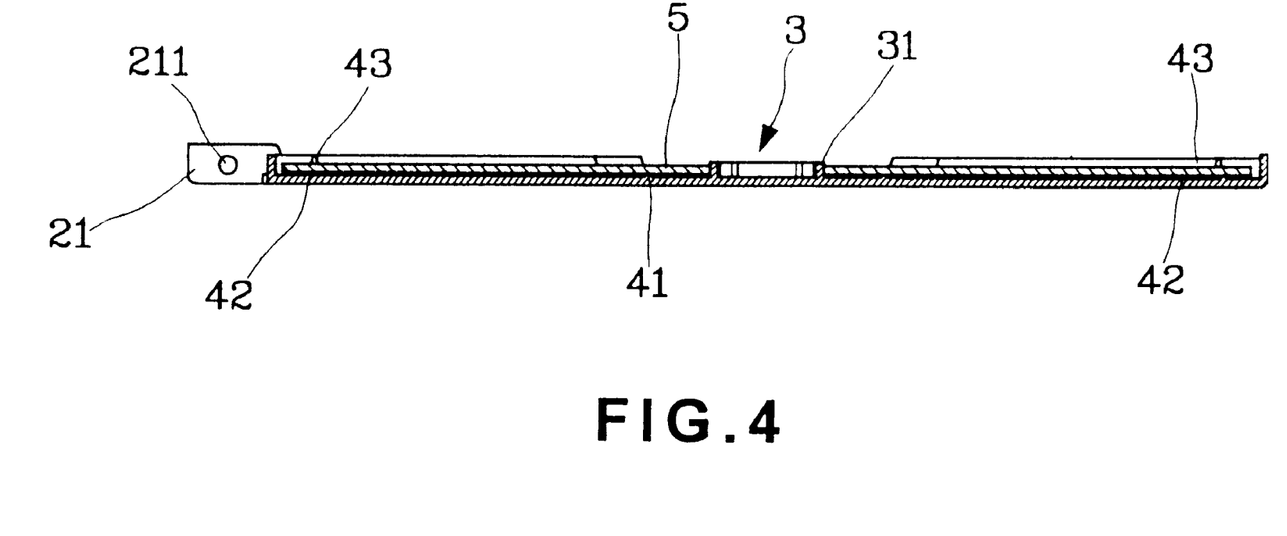
FIG. 4 is an assembled sectional view of the low-profile compact disk of FIG. 1 with a piece of compact disk positioned therein.

As shown in FIGS. 1 and 4, a low-profile CD case for storing a regular compact disk 5 can be easily provided simply by pivotally connecting the top cover 1 at its rear or pivotal end to the rear or pivotal end of the bottom seat 2 by engaging the pivotal holes 142 with the protrusions 211. The separate CD deck that is otherwise required in the conventional CD case is completely not needed in the CD case provided according to the present invention. The problems, such as extra material required and troublesome assembling procedures, encountered in conventional CD cases can therefore be eliminated. The CD case according to the present invention can be manufactured in a more effective and simple manner to reduce cost needed for assembling the case. Moreover, the CD case of the present invention has a reduced overall height or thickness less than 10 mm and close to 5 mm. A low-profile CD case according to a preferred embodiment of the present invention is 5.2 mm in height and is much lower or thinner than the conventionally structured CD cases. The low-profile CD case is more convenient for consumers to store, and requires largely reduced volume and accordingly freight in transportation of a large quantity of such CD cases and CD's received therein.

To enable a beautiful appearance and to protect the compact disk 5 inside the low-profile CD case of the present invention from direct sunshine, the bottom seat 2 may be produced with colored material.

With the above arrangements, the top cover 1 and the bottom seat 2 may be fitly closed to each other with the low-raised side walls 12 and the rear wall 14 of the top cover 1 resting on the stepped shoulder portions 23 and closely contacting with the two walls 22 of the bottom seat 2 to effectively prevent dust from entering into the closed CD case.

When a regular compact disk 5 is positioned on the bottom seat 2, the a plurality of flexible pawls 31 on the central holding means 3 on the bottom seat 2 upward project from the central opening of the compact disk 5 and elastically hold the compact disk 5 in place.

The first protective means of the low-raised circular rib 41 and the second protective means of the low-raised curved ribs 42 together protect the compact disk 5 from directly contacting with the inner side of the plane surface of the bottom seat 2 and therefore from wearing or damage due to such contact. The third protective means of the high-raised curved ribs 43 protect the compact disk 5 stored in the low-profile CD case from direct contacting with and being compressed by the top cover 1 when the latter is closed onto the bottom seat 2. Therefore, the low-profile CD case of the present invention has exactly the same CD storing function as that would be provided by a conventional thick CD case, and allows pleasant package to enhance the high quality of the whole product.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A low-profile compact disk (CD) case comprising a top cover and a bottom seat pivotally connected to each other at pivotal edges thereof to provide an inner space for receiving a compact disk therein; said low profile CD case including an inner surface, central holding means, a plurality of protective means and a bottom seat integrally formed on said inner surface by injection molding so that a compact disk may be positioned in said low-profile CD case on said bottom seat around said central holding means and on said protective means and said bottom seat, protective means and top cover being constructed and arranged to prevent an additional CD disk from being stored between said top cover and said bottom seat, and wherein said central holding means is a short hollow cylinder extending upwardly from said bottom seat and having spaced cuts along a circumferential wall to provide a plurality of flexible catch pawls, said protective means including a low-raised circular rib encircling and being concentric with said central holding means, at least two low-raised curved ribs defining a circle concentric with said central holding means and extending to positions where an outer periphery of a compact disk will rest and a plurality of upwardly extending curved ribs closely located at and extending along an outer side of said low-raised curved ribs and said plurality of upwardly extending curved ribs having a height slightly higher than that of said low-raised ribs and, wherein said top cover includes a plane surface defining a front (or free) end, a rear (or pivotal) end, and two lateral sides, ribs being provided on an inner side of said plane surface near said front and said rear ends at predetermined positions for locating an advertising sheet to the inner side of said plane surface of said top cover, two side walls being separately formed along said two lateral sides of said top cover to vertically extend downward by a predetermined distance, semicircular members being symmetrically provided on said two side walls at suitable positions close to said front and said rear ends of said top cover, such that said semicircular members at two opposite sides of said top cover project inward toward one another, a portion of said top cover near said rear end having a slightly narrowed width, a rear wall extending along said narrowed rear portion to give a substantially n-shaped cross section including two short wings, said rear wall vertically extending downward by a predetermined small distance, and a pivotal hold being provided on each of said short wings; and said bottom seat including a plane surface defining a front (or free) end, a rear (or pivotal) end, and two lateral sides, said bottom seat being provided at said rear ends of said two lateral sides with an extended arm each of said extended arms being provided at an inner side with a protrusion corresponding to said pivotal holes on said two wings of said top cover, such that said top cover may be pivotally connected at said rear or pivotal end to said bottom seat by separately extending said two protrusions into said two pivotal holes, two walls being provided on an inner side of said bottom seat to separately horizontally extend along said front and said rear ends of said bottom seat, such that said walls have a substantially n-shaped cross section including two short wing portions, semicircular dust-proof recesses being symmetrically provided on said two lateral sides of said bottom seat within said wing portions of said two n-shaped walls and corresponding to said semicircular members on said top cover, narrow spaces being left between outer surfaces of said wing portions of said walls and outmost edges of said two lateral sides of said bottom seat to provide stepped shoulder portions, onto which said side walls of said top cover are rested when said top cover is in its closed position over said bottom seat.

2. A low-profile CD case as claimed in claim 1, wherein said CD case formed by pivotally connected said top cover to said bottom seat has an overall height or thickness within the range from 5 mm to 10 mm.

3. A low-profile CD case as claimed in claim 1, wherein said CD case formed by pivotally connected said top cover to said bottom seat has an overall height or thickness of 5.2 mm.

4. A low-profile CD case as claimed in claim 1, wherein said bottom seat is made of colored material to protect said compact disk stored in said CD case from direct sunshine.

\* \* \* \* \*

(12) EX PARTE REEXAMINATION CERTIFICATE (5507th)
United States Patent
Wong et al.

(10) Number: US 6,283,282 C1
(45) Certificate Issued: Sep. 12, 2006

(54) LOW-PROFILE COMPACT DISK CASE (75) Inventors: Ming-Sen Wong, Taipei (TW); Chen-Cheng Chang, Tao Yuan Shien (TW)

(73) Assignee: CMC Magnetics Corporation, Taipei (TW)

Reexamination Request:
No. 90/006,223, Feb. 20, 2002
No. 90/006,266, Apr. 15, 2002

Reexamination Certificate for:
Patent No.: 6,283,282
Issued: Sep. 4, 2001
Appl. No.: 09/531,154
Filed: Mar. 17, 2000

(30) Foreign Application Priority Data

Oct. 25, 1999 (TW) ........................ 88211758 U (51) Int. Cl.
*B65D 85/57* (2006.01)

(52) U.S. Cl. .................... 206/308.1; 206/310
(58) Field of Classification Search ................ 206/303, 206/307, 308.1, 308.2, 310, 493
See application file for complete search history.

(56) References Cited

U.S. PATENT DOCUMENTS

| | | | |
|---|---|---|---|
| 5,253,751 A | 10/1993 | Wipper | |
| 5,259,498 A | 11/1993 | Weisburn et al. | |
| 5,284,243 A | 2/1994 | Gelardi et al. | |
| 5,433,319 A | 7/1995 | Tang | |
| 5,515,968 A | 5/1996 | Taniyama | |

FOREIGN PATENT DOCUMENTS

| | | |
|---|---|---|
| JP | 5-19115 | 3/1993 |
| JP | UM5-19115 | 3/1993 |
| JP | 8-90610 | 4/1996 |
| JP | UM3052115 | 6/1998 |
| JP | 3052115 | 9/1998 |
| JP | 11-165783 | 6/1999 |

*Primary Examiner*—Shian T. Luong (57) ABSTRACT

A low-profile compact disk (CD) case includes pivotally connected top cover and bottom seat to provide an inner space for receiving a compact disk therein. The bottom seat is integrally formed on an inner surface with a central holding means and a plurality of protective means. The central holding means is a short hollow cylinder upward projected from the bottom seat and has spaced cuts along its circumferential wall to provide a plurality of flexible catch pawls for holding a compact disk in place. First and second protective means are low-raised ribs for supporting and preventing the compact disk from direct contact with the bottom seat, and the third protective means are raised curved ribs higher than the first and second ribs and the compact disk for protecting the compact disk from compression by the top cover. No extra CD deck is required and an overall height or thickness and production costs of the CD case can therefore be largely reduced.

AMENDED

FIG. 1 AMENDED

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, Before line 16:

*The bottom seat 2 includes an intermediate indentation 2' in a middle portion of each of the two lateral sides. This indentation 2' corresponds to a downward extension or riser 12' in each of the walls 12 so that the top cover 1 may be fitly closed onto the bottom seat 2 as described above.*

THE DRAWING FIGURES HAVE BEEN CHANGED AS FOLLOWS:

Reference numerals 12' and 2' have been added to FIG. 1.

Reference numeral 12' has also been added to FIG. 2B.

Reference numeral 2' has also been added to FIG. 3A.

AS A RESULT OF REEXAMINATION, IT HAS BEEN DETERMINED THAT:

Claims 1–4 are cancelled.

\* \* \* \* \*